United States Patent
Hagi

(10) Patent No.: US 9,701,263 B2
(45) Date of Patent: Jul. 11, 2017

(54) WIRE HARNESS

(71) Applicant: SUMITOMO WIRING SYSTEMS, LTD., Mie (JP)

(72) Inventor: Masahiro Hagi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/185,673

(22) Filed: Jun. 17, 2016

(65) Prior Publication Data

US 2017/0001580 A1  Jan. 5, 2017

(30) Foreign Application Priority Data

Jul. 3, 2015 (JP) ................. 2015-134289

(51) Int. Cl.
*H02G 3/32* (2006.01)
*B60R 16/02* (2006.01)

(52) U.S. Cl.
CPC ........... *B60R 16/0215* (2013.01); *H02G 3/32* (2013.01)

(58) Field of Classification Search
USPC ....................................... 439/604
See application file for complete search history.

(56) References Cited

U.S. PATENT DOCUMENTS

| | | | | |
|---|---|---|---|---|
| 3,711,633 A * | 1/1973 | Ghirardi | ................. | H02G 3/06 174/135 |
| 4,919,462 A * | 4/1990 | Matsui | ................. | H02G 3/0691 285/125.1 |
| 5,072,972 A * | 12/1991 | Justice | ................. | F16L 25/0036 285/148.11 |
| 6,085,795 A * | 7/2000 | Ogawa | ................. | B60R 16/0222 138/108 |
| 6,595,473 B2 * | 7/2003 | Aoki | ................. | F16L 3/10 138/108 |
| 6,968,864 B2 * | 11/2005 | Miyamoto | ................. | B60R 16/0215 138/108 |
| 2002/0000499 A1 * | 1/2002 | Aoki | ................. | F16L 3/10 248/74.4 |
| 2009/0314511 A1 * | 12/2009 | Hagi | ................. | H01R 4/726 174/78 |

FOREIGN PATENT DOCUMENTS

JP  2012-056368  3/2012

* cited by examiner

*Primary Examiner* — William H Mayo, III
*Assistant Examiner* — Krystal Robinson
(74) *Attorney, Agent, or Firm* — Greenblum & Bernstein, P.L.C.

(57) ABSTRACT

A wire harness includes: a wire harness main body in which a plurality of wires are bundled together; a first protective tube (protective tube) made of synthetic resin and enclosing the wire harness main body; a ring member provided so as to surround the first protective tube and fixated to a vehicle body via a clamp; and a holding mechanism holding the ring member and first protective tube so as to enable relative displacement within a predetermined tolerance range.

7 Claims, 3 Drawing Sheets

WIRE HARNESS

CROSS-REFERENCE TO RELATED APPLICATIONS

The present application claims priority under 35 U.S.C. §119 of Japanese Application No. 2015-134289, filed on Jul. 3, 2015, the disclosure of which is expressly incorporated by reference herein in its entirety.

BACKGROUND OF THE INVENTION

1. Field of the Invention

The present invention relates to a wire harness.

2. Description of Related Art

Japanese Patent Laid-open Publication No. 2012-056368 describes a technology routing a wire harness between an inverter and a motor in a hybrid vehicle or electric automobile. Examples of a mechanism protecting a wire harness of this kind can include enclosing the wire harness in a protective tube configured by a corrugated tube made of synthetic resin. In addition, the wire harness is routed along a vehicle body, and therefore a routing path of the wire harness may include a curved portion. Given this, the wire harness must be positioned along a predetermined routing path. A suggested method for doing this is to fit a clamp to an exterior of the protective tube and fixate the clamp to the vehicle body.

In a case where the wire harness is routed in a region that experiences high temperature environments, a PA (polyamide) resin having excellent heat resistance and flame retardant properties is used as a material of the protective tube. However, there is a risk that the protective tube configured by PA resin may crack when the protective tube experiences vibration in a low temperature environment, such as below freezing.

The present invention is perfected in view of the circumstances above and prevents damage to a protective tube caused by vibration.

SUMMARY OF THE INVENTION

A wire harness according to the present invention includes: a wire harness main body in which a plurality of wires are bundled together; a protective tube made of synthetic resin and enclosing the wire harness main body; a ring member provided so as to surround the protective tube and fixated to a vehicle body via a clamp; and a holding mechanism holding the ring member and protective tube so as to enable relative displacement within a predetermined tolerance range.

When vibration of the vehicle body is communicated to the protective tube and the ring member via the clamp, the protective tube deforms while displacing relative to the ring member. Therefore, a concentration of stress in the protective tube is alleviated as compared to a case where the protective tube is fixated to the ring member. Therefore, damage to the protective tube caused by vibration can be prevented according to the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
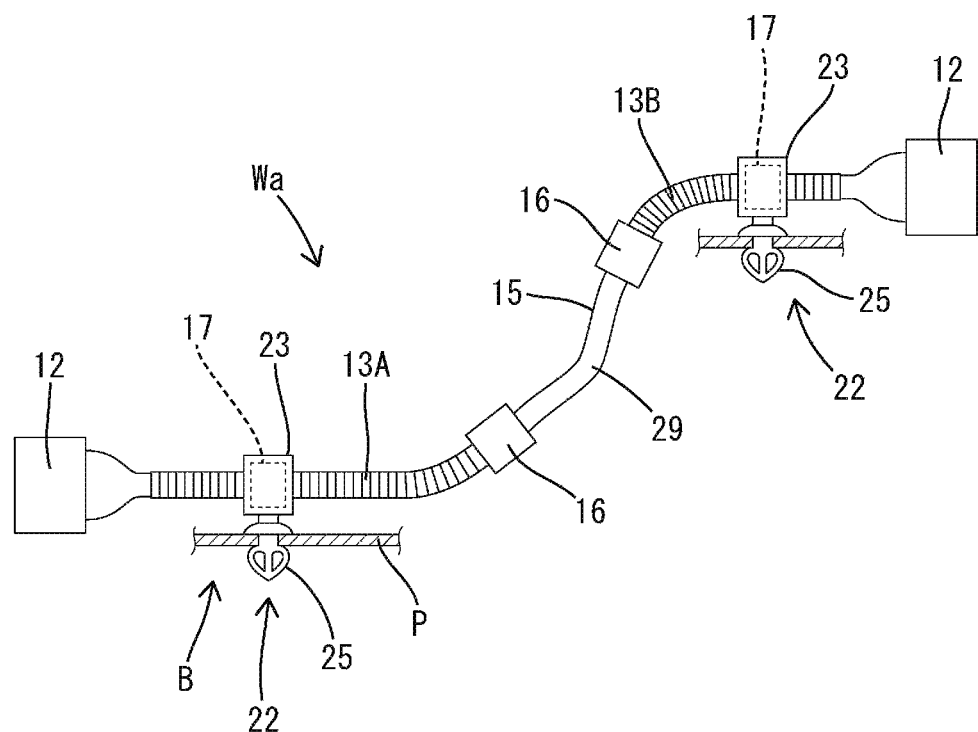
FIG. 1 is a lateral view of a state where a wire harness according to a first embodiment is mounted to a vehicle body.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

(a) In the present invention, a holding mechanism may be configured by a circumference direction projection projecting on an inner circumferential surface of a ring member; and a channel formed on an outer circumferential surface of a protective tube, the projection fitting into the channel with clearance. According to this configuration, when vibration is communicated to the protective tube and the ring member, the protective tube can displace relative to the ring member by the amount of the clearance between the channel and the projection.

(b) In the present invention according to (a), the ring member may have an accordion shape. According to this configuration, a known corrugated tube can be used as the ring member, and therefore costs can be reduced.

(c) In the present invention according to (b), by fitting an engagement projection formed on an inner circumferential surface of a clamp into a recess on an outer circumferential surface of the ring member, the ring member and the clamp may be fixated to each other. According to this configuration, the ring member and the clamp can be fixated in a state where axis direction displacement is constrained due to the engagement of the engagement projection and the recess.

(d) In the present invention, the protective tube may enclose a region around a length-direction portion of a wire harness main body; a region of the wire harness main body not enclosed by the protective tube may be enclosed by a second protective tube configured by a synthetic resin; and a region of the wire harness main body not enclosed by the protective tube and the second protective tube may be enclosed by a rubber tube coupled at two ends to the protective tube and the second protective tube. According to this configuration, even when the second protective tube experiences significant vibration, the vibration is dampened by the rubber tube, and therefore there is no risk of the vibration of the protective tube being amplified by the second protective tube. (e) In the present invention according to (d), the wire harness main body may include a curved location, and the curved location may be enclosed by the rubber tube. According to this configuration, the wire harness main body includes the curved location, where stress is likely to accumulate, but damage to the protective tube is prevented by providing the holding mechanism. Moreover, by enclosing the curved location with the rubber tube, stress occurring at the curved location is alleviated.

(f) In the present invention, the holding mechanism may be an elastic tape material placed between an outer circumferential surface of the protective tube and an inner circumferential surface of the ring member. According to this configuration, when vibration is communicated to the protective tube and the ring member, the protective tube can displace relative to the ring member due to elastic deformation of the elastic tape material.

(g) In the present invention, the clamp and ring member may be fixated by adhesive tape. According to this configuration, an inner circumferential shape of the clamp and an outer circumferential shape of the ring member can be simplified.

First Embodiment

Figure 2:
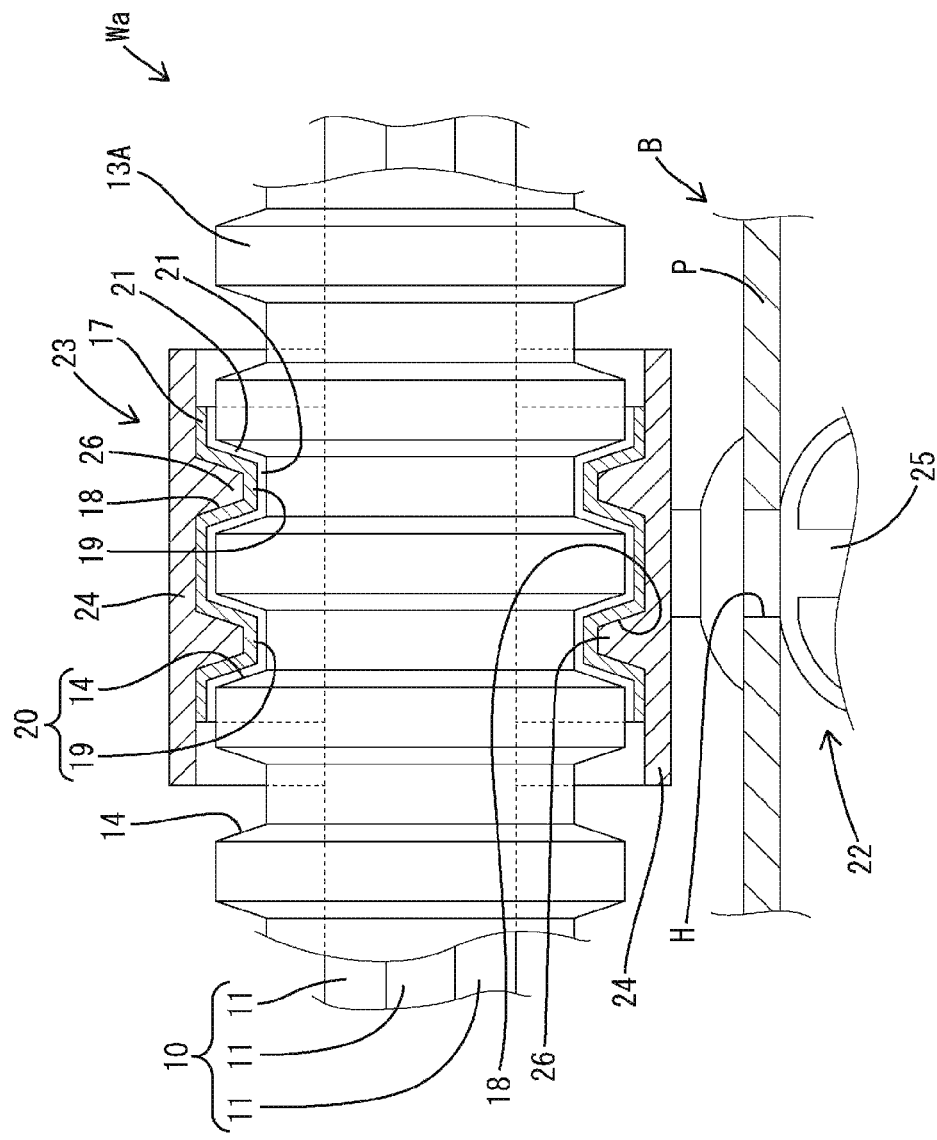
FIG. 2 is a partial cutaway, partially expanded lateral view of the wire harness.

Hereafter, a first embodiment of the present invention is described with reference to FIGS. 1 and 2. A wire harness Wa according to the first embodiment is mounted in an electric automobile, hybrid automobile, or the like, and is routed between a motor (not shown in the drawings) and an inverter (not shown in the drawings), for example, to configure a power circuit.

The wire harness Wa includes a wire harness main body 10 in which three wires 11 are bundled together; and two connectors 12 connected to both end portions of the wire harness main body 10. A first connector 12 is connected, for example, to the motor while a second connector 12 is connected, for example, to the inverter. The wire harness Wa further includes one first protective tube 13A (described as a protective tube in the claims); one second protective tube 13B (described as a second protective tube in the claims); one rubber tube 15; and two ring members 17. The wire harness Wa (wire harness main body 10) includes a curved location 29 having a comparatively small curvature radius.

The first protective tube 13A and the second protective tube 13B are each configured from a corrugated tube made of PA (polyamide) resin, which has excellent heat resistance and flame retardant properties. FIG. 2 illustrates the first protective tube 13A, but the configuration of the second protective tube 13B is identical to that of the first protective tube 13A. The first protective tube 13A and the second protective tube 13B each have an accordion shape, and are capable of elastic deformation in a form that curves the axis line of the protective tube. A plurality of channels 14 lying along the circumference direction are formed on the outer circumferential surface of the first protective tube 13A and second protective tube 13B at constant intervals along the axis line of the wire harness Wa (the first protective tube 13A and second protective tube 13B). The rubber tube 15 has elasticity and can absorb vibration. The rubber tube 15 is capable of elastic deformation in a form that curves the axis line of the rubber tube 15, similarly to the protective tubes 13A and 13B.

The first protective tube 13A encloses a region of the wire harness main body 10 on, for example, a motor side of the wire harness main body 10. The second protective tube 13B encloses a region of the wire harness main body 10 on, for example, an inverter side of the wire harness main body 10 (i.e., a portion of a region not enclosed by the first protective tube 13A). In addition, the rubber tube 15 encloses a region of the wire harness main body 10 not enclosed by either of the protective tubes 13A and 13B. The region enclosed by the rubber tube 15 includes the curved location 29. A first end portion of the rubber tube 15 is anchored to an end portion of the first protective tube 13A by an anchoring mechanism 16 configured by adhesive tape or the like. A second end portion of the rubber tube 15 is anchored to an end portion of the second protective tube 13B by the anchoring mechanism 16 configured by adhesive tape or the like.

Like the protective tubes 13A and 13B, the ring member 17 is configured from a corrugated tube made of PA (polyamide) resin. A length dimension of the ring member 17 in the axis direction is short as compared to the protective tubes 13A and 13B. However, a diameter dimension of the ring member 17 is configured to be one size larger than that of the protective tubes 13A and 13B. A slit (not shown in the drawings) is formed in the ring member 17 in the axis direction. Accordingly, the ring member 17 can elastically deform to enlarge and open so as to increase a width of the slit. By deforming the slit so as to enlarge the opening, the two ring members 17 are mounted to the first protective tube 13A and the second protective tube 13B so as to surround the protective tubes 13A and 13B.

A plurality of recesses 18 in the circumference direction are formed on an outer circumferential surface of the ring member 17 at a predetermined pitch in the axis direction. A plurality of projections 19 in the circumference direction are formed in regions on an inner circumferential surface of the ring member 17 where the recesses 18 are formed, at a predetermined pitch in the axis direction. The ring members 17 are mounted to the outer circumferential surface of the protective tubes 13A and 13B in a state where the projections 19 advance into the channels 14. In the mounted state, the ring members 17 regulate detachment in the diameter direction with respect to the protective tubes 13A and 13B, and also regulate detachment in the axis direction due to the engagement of the projections 19 and channels 14. The projections 19 and channels 14 configure a holding mechanism 20 holding the ring members 17 and protective tubes 13A and 13B so as to enable relative displacement within a predetermined tolerance range.

Specifically, an arrangement pitch of the recesses 19 in the axis direction is the same pitch as the arrangement pitch of the channels 14 of the two protective tubes 13A and 13B. An inner diameter of a region on the inner circumferential surface of the ring member 17 where the projection 19 is not provided has a larger dimension than the outer diameter of the two protective tubes 13A and 13B. The minimum inner diameter dimension of the projection 19 is greater than the minimum outer diameter dimension of the channel 14 of the two protective tubes 13A and 13B, and is defined by the outer diameter of the two protective tubes 13A and 13B. An axis direction dimension of the projection 19 is defined to be smaller than the axis direction dimension of the channel 14.

Due to these dimension configurations, a diameter direction clearance 21 that is smaller than a projection dimension of the projection 19 and a depth dimension of the channel 14, and an axis direction clearance 21 that is smaller than the axis direction pitch of the projection 19 and channel 14 are ensured between the ring members 17 and the protective tubes 13A and 13B. Due to these clearances 21, the ring members 17 and protective tubes 13A and 13B are capable of relative displacement in the diameter direction and axis direction while remaining attached to each other.

A ring member 17 is provided between the first protective tube 13A and a clamp 22 surrounding the first protective tube 13A, and a ring member 17 is also provided between the second protective tube 13B and a clamp 22 surrounding the second protective tube 13B. Via the clamps 22, the wire harness Wa having the above-noted configuration is mounted to a panel P in a vehicle body B. The clamp 22 is a singular component made of synthetic resin which includes a cylindrical tubular main body 23 integrating a pair of half members 24 connected by a hinge (not shown in the drawings); and a clip 25 capable of elastic deformation which projects from an outer circumferential surface of one of the half members 24. An inner diameter of the main body 23 is substantially the same as the outer diameter of the ring member 17. A plurality of engagement projections 26 along the circumference direction are formed on an inner circumferential surface of the main body 23 (half member 24) at a predetermined pitch in the axis direction.

The clamp 22 is mounted to the ring member 17 in a state surrounding the ring member 17 by fitting the engagement projections 26 together with the recesses 18. In the mounted state, due to the engagement of the engagement projections 26 and the recesses 18, the ring member 17 (wire harness Wa) and the clamp 22 are fixated in a state where relative displacement between the ring member 17 and the clamp 22 in the axis direction is regulated. In addition, the clamp 22 is fixated to the vehicle body B by fitting the clip 25 together with an attachment hole H of the panel P. Either one of attaching the clamp 22 to the vehicle body B (panel P) and integrating the clamp 22 with the wire harness Wa may be performed first.

In a state where the wire harness Wa is mounted to the vehicle body B by two of the clamps 22, the clearances 21 allowing the protective tubes 13A and 13B to displace in the diameter direction and axis direction are ensured between the outer circumferential surface of the protective tubes 13A and 13B and the inner circumferential surface of the ring members 17. Accordingly, when the protective tubes 13A and 13B vibrate while the vehicle is traveling, the ring members 17 do not greatly restrict movement of the regions of the protective tubes 13A and 13B surrounded by the ring members 17. Specifically, although the regions of the protective tubes 13A and 13B surrounded by the ring members 17 abut the ring members 17, the regions are capable of repeated elastic deformation allowing curvature of the regions to change smoothly, and there is no risk of stress concentrating in portions encumbered by the ring members 17.

As described above, the wire harness Wa according to the first embodiment includes: the wire harness main body 10 in which a plurality of wires 11 (three) are bundled together; the protective tubes 13A and 13B made of a synthetic resin and enclosing the wire harness main body 10; the ring members 17 provided so as to surround the protective tubes 13A and 13B and fixated to the vehicle body B via the clamps 22; and the holding mechanism 20 holding the ring members 17 and protective tubes 13A and 13B so as to enable relative displacement within a predetermined tolerance range. According to this configuration, when vibration of the vehicle body B is communicated to the protective tubes 13A and 13B and the ring members 17, the protective tubes 13A and 13B deform while displacing relative to the ring members 17. Therefore, concentration of stress in the protective tubes 13A and 13B is alleviated as compared to a case where the protective tubes 13A and 13B are fixated to the ring members 17. Therefore, damage to the protective tubes 13A and 13B caused by vibration can be prevented with the wire harness Wa according to the first embodiment.

In addition, the holding mechanism 20 is configured by the circumference direction projection 19 projecting on the inner circumferential surface of the ring member 17; and the channel 14 into which the projection 19 fits with the clearance 21, formed on the outer circumferential surface of the protective tubes 13A and 13B. According to this configuration, when vibration is communicated to the protective tubes 13A and 13B and the ring members 17, the protective tubes 13A and 13B can displace relative to the ring members 17 by the amount of the clearance 21 between the channel 14 and the projection 19. Also, because the ring members 17 have an accordion shape, a known corrugated tube can be used as the ring members 17. Accordingly, costs for the ring member 17 can be reduced. In addition, the engagement projection 26 formed on the inner circumferential surface of the clamp 22 is fitted into the recess 18 on the outer circumferential surface of the ring member 17. According to this configuration, the ring member 17 and the clamp 22 can be held in a state where axis direction displacement is constrained due to the engagement of the engagement projection 26 and the recess 18.

Furthermore, the protective tube 13A encloses a region around a length-direction portion of the wire harness main body 10; the region of the wire harness main body 10 not enclosed by the protective tube 13A is enclosed by the second protective tube 13B, which is configured by a synthetic resin; and a region of the wire harness main body 10 enclosed by neither the first protective tube 13A nor the second protective tube 13B is enclosed by the rubber tube 15, which is coupled at both ends to the first protective tube 13A and the second protective tube 13B. According to this configuration, even when the second protective tube 13B experiences a significant vibration, the vibration is dampened by the rubber tube 15, and therefore there is no risk of the vibration of the first protective tube 13A being amplified by the second protective tube 13B. Similarly, even when the first protective tube 13A experiences a significant vibration, the vibration is dampened by the rubber tube 15, and therefore there is no risk of the vibration of the second protective tube 13B being amplified by the first protective tube 13A. Also, in the first embodiment, the wire harness main body 10 includes the curved location 29, which is enclosed by the rubber tube 15. This configuration includes the curved location 29, where stress is likely to accumulate in the wire harness main body 10, but damage to the protective tubes 13A and 13B is prevented by providing the holding mechanism 20. Moreover, by enclosing the curved location 29 with the rubber tube 15, stress occurring at the curved location 29 is alleviated.

Second Embodiment

Figure 3:
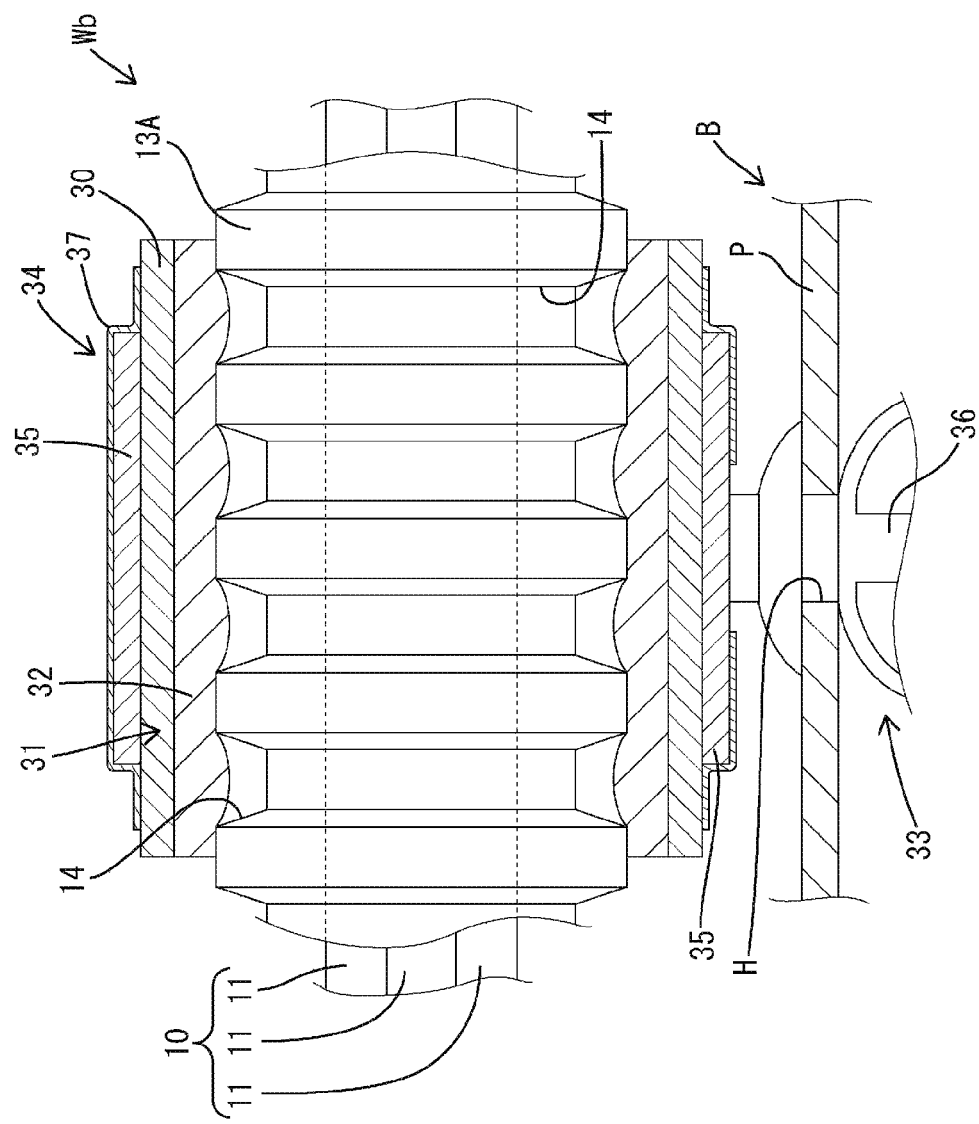
FIG. 3 is a partial cutaway, partially expanded lateral view of a wire harness according to a second embodiment.

Hereafter, a second embodiment of the present invention is described with reference to FIG. 3. A wire harness Wb according to the second embodiment includes a ring member 30, a holding mechanism 31, and a clamp 33 having configurations that differ from those of the first embodiment described above. Other configurations (the first protective tube 13A and the second protective tube 13B) are identical to those of the first embodiment. Therefore, identical configurations are assigned identical reference numerals and descriptions of such configurations, as well as their operation and effects, are omitted.

The ring member 30 is configured by the PA (polyamide) resin, as in the first embodiment, and is mounted to the outer circumferential surface of the first protective tube 13A and the outer circumferential surface of the second protective tube 13B. A length dimension of the ring member 30 in the axis direction is short as compared to the protective tubes 13A and 13B. In addition, an inner diameter dimension of the ring member 30 is constant across the entire axis direction length, and is larger than the outer diameter dimension of the protective tubes 13A and 13B. The outer diameter dimension of the ring member 30 is also constant across the entire axis direction length. A slit (not shown in the drawings) is formed in the ring member 30 in the axis direction. Accordingly, the ring member 30 can elastically deform to enlarge and open so as to increase a width of the slit. By deforming the slit so as to enlarge the opening, the two ring members 30 are mounted to the first protective tube 13A and the second protective tube 13B so as to surround the protective tubes 13A and 13B.

The holding mechanism 31 is configured by a cylindrical tubular elastic tape material 32 interposed between the outer circumferential surface of the protective tubes 13A and 13B and the inner circumferential surface of the ring members 30. An axis direction dimension of the elastic tape material 32 is substantially the same as that of the ring member 30. An inner circumferential surface of the elastic tape material 32 adheres to the outer circumferential surface of the protective tubes 13A and 13B, and an outer circumferential surface of the elastic tape material 32 adheres to the inner circumferential surface of the ring member 30. The elastic tape material 32 is configured by a resin material capable of elastic deformation in the diameter direction and axis direction.

The elastic tape material 32 may be configured by, for example: a thick material having the same width as the ring member 30 wound once around the outer circumferential surface of the protective tubes 13A and 13B; a thick material narrower than the ring member 30 spiral-wrapped around the outer circumferential surface of the protective tubes 13A and 13B; a thin material having substantially the same width as the ring member 30 wound multiple times around the outer circumferential surface of the protective tubes 13A and 13B; or a thin material narrower than the ring member 30 spiral-wrapped multiple times around the outer circumferential surface of the protective tubes 13A and 13B.

One clamp 33 is fitted to an exterior of each of the ring member 30 of the first protective tube 13A and the ring member 30 of the second protective tube 13B. The clamp 33 is a singular component made of synthetic resin which includes a cylindrical tubular main body 34 integrating a pair of half members 35 connected by a hinge (not shown in the drawings); and a clip 36 capable of elastic deformation which projects from an outer circumferential surface of one of the half members 35. An inner diameter of the main body 34 is substantially the same as the outer diameter of the ring member 30. An axis direction dimension of the main body portion 34 is smaller than that of the ring member 30.

When the clamp 33 is fitted to the exterior of the ring member 30 and the half members 35 are fixated in a state joined to each other, the inner circumferential surface of the main body 34 adheres to the outer circumferential surface of the ring member 30 and presses inward in the diameter direction against the ring member 30. The ring member 30 being pressed adheres to the outer circumferential surface of the elastic tape material 32, and the inner circumferential surface of the elastic tape material 32 elastically adheres to the outer circumferential surface of the protective tubes 13A and 13B. In addition, a portion of the inner circumference of the elastic tape material 32 enters the recesses on the outer circumference of the protective tubes 13A and 13B, and therefore relative displacement in the axis direction between the elastic tape material 32 and the protective tubes 13A and 13B is regulated. Moreover, the outer circumferential surface of the elastic tape material 32 presses elastically against the inner circumferential surface of the ring member 30, and therefore relative displacement in the axis direction between the elastic tape material 32 and the ring member 30 is regulated.

After the clamp 33 is fitted to the exterior of the ring member 30 and the main body 34 is fixated in a cylindrical tubular shape, an adhesive tape 37 is wrapped around an area spanning from the outer circumferential surface of the main body 34 to an exposed region of the outer circumferential surface of the ring member 30 not enclosed by the main body 34. Due to adhesive strength of the adhesive tape 37, the ring member 30 (wire harness Wb) and the clamp 33 are fixated in a state where relative displacement between the ring member 30 and the clamp 33 in the axis direction is regulated. In addition, the clamp 33 is fixated to the vehicle body by fitting the clip 36 together with the attachment hole H of the panel P, as in the first embodiment.

In a state where the wire harness Wb is mounted to the vehicle body by two of the clamps 33, the elastic tape material 32, which is capable of elastic deformation, is provided between the outer circumferential surface of the protective tubes 13A and 13B and the inner circumferential surface of the ring members 30. Accordingly, when the protective tubes 13A and 13B vibrate while the vehicle is traveling, the ring members 30 do not greatly restrict movement of the regions of the protective tubes 13A and 13B surrounded by the ring members 30. Specifically, although the regions of the protective tubes 13A and 13B surrounded by the ring members 30 cause the elastic tape material 32 to elastically deform, the regions are capable of repeated elastic deformation allowing curvature of the regions to change smoothly. Accordingly, stress can be inhibited from concentrating in the protective tubes 13A and 13B.

In the wire harness Wb according to the second embodiment, the holding mechanism 31 is the elastic tape material 32, which is capable of elastic deformation and is interposed between the outer circumferential surface of the protective tubes 13A and 13B and the inner circumferential surface of the ring members 30. According to this configuration, when vibration is communicated to the protective tubes 13A and 13B and to the ring members 30, the protective tubes 13A and 13B can displace relative to the ring members 30 due to elastic deformation of the elastic tape material 32. Because the clamps 33 and the ring members 30 are fixated by the adhesive tape 37, the inner circumferential shape of the clamps 33 and the outer circumferential shape of the ring members 30 can be simplified.

Other Embodiments

The present invention is not limited to the embodiments according to the above description and the drawings; instead, the technical scope of the present invention also includes, for example, the following embodiments.

(1) In the first and second embodiments described above, a first protective tube (protective tube) is configured by a corrugated tube. However, the first protective tube may also be a synthetic resin member other than a corrugated tube.

(2) In the first and second embodiments described above, a second protective tube (second protective tube) is configured by a corrugated tube. However, the second protective tube may also he a synthetic resin member other than a corrugated tube.

(3) In the first embodiment described above, an exemplary mechanism fixating a clamp and a ring member is an engagement projection on an inner circumferential surface of the clamp being fitted together with a recess on an outer circumferential surface of the ring member. However, the mechanism is not limited to this, and the clamp and ring member may instead be fixated using adhesive tape, as in the second embodiment.

(4) In the first and second embodiments described above, a rubber tube is interposed between the first protective tube (protective tube) and the second protective tube (second protective tube). However, the present invention is not limited to this, and the first protective tube and second protective tube may instead be joined directly to each other without using the rubber tube.

(5) In the first and second embodiments described above, a wire harness main body is enclosed in two protective tubes (the first protective tube and second protective tube) and one rubber tube. However, the present invention is not limited to this, and the wire harness main body may instead be enclosed by only one protective tube.

(6) In the first and second embodiments described above, the wire harness main body is configured by three wires. However, the number of wires configuring the wire harness main body may instead be two, or four or more.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A wire harness comprising:
a wire harness main body in which a plurality of wires are bundled together;
a protective tube made of synthetic resin and enclosing the wire harness main body;
a ring member surrounding the protective tube and fixed to a vehicle body via a clamp; and
a holder holding the ring member and protective tube so as to enable relative displacement within a predetermined tolerance range;
the holder comprising a circumference direction projection projecting from an inner circumferential surface of the ring member, and a channel formed on an outer circumferential surface of the protective tube,
the projection having an inner diameter dimension greater than an outer diameter dimension of the channel, and the projection having an axial direction dimension smaller than an axial direction dimension of the channel, such that the projection fits into the channel with diameter direction clearance between the projection and the channel, and axial direction clearance between the projection and the channel.

2. The wire harness according to claim 1, wherein the ring member has an accordion shape.

3. The wire harness according to claim 2, wherein by fitting an engagement projection formed on an inner circumferential surface of the clamp into a recess on an outer circumferential surface of the ring member, the ring member and the clamp are fixed to each other.

4. The wire harness according to claim 1, wherein the protective tube encloses a region around a length-direction portion of the wire harness main body,
a region of the wire harness main body not enclosed by the protective tube is enclosed by a second protective tube configured by synthetic resin; and
a region of the wire harness main body enclosed by neither the protective tube nor the second protective tube is enclosed by a rubber tube coupled at two ends to the protective tube and the second protective tube.

5. The wire harness according to claim 4, wherein the wire harness main body includes a curved location, and the curved location is enclosed by the rubber tube.

6. A wire harness comprising:
a wire harness main body in which a plurality of wires are bundled together;
a protective tube made of synthetic resin and enclosing the wire harness main body;
a ring member surrounding the protective tube and fixated fixed to a vehicle body via a clamp; and
a holder holding the ring member and protective tube so as to enable relative displacement within a predetermined tolerance range;
the ring member having a constant inner diameter dimension, wherein the holder is an elastically deformable tape material placed between an outer circumferential surface of the protective tube and an inner circumferential surface of the ring member.

7. The wire harness according to claim 6, wherein the clamp and ring member are fixed by adhesive tape.

* * * * *